United States Patent Office 3,551,421
Patented Dec. 29, 1970

---

3,551,421
NOVEL TRIAZINES
Daniel Bertin, Montrouge, and Jacques Perronnet, Paris, France, assignors to Roussel-UCLAF, Paris, France, a corporation of France
No Drawing. Filed Nov. 13, 1968, Ser. No. 775,545
Claims priority, application France, Nov. 16, 1967, 128,510
Int. Cl. C07d 55/46
U.S. Cl. 260—249.8   3 Claims

ABSTRACT OF THE DISCLOSURE

Novel triazines of the formula

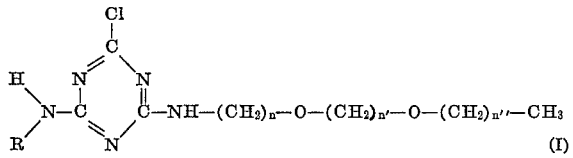

wherein R is a lower alkyl of 1 to 7 carbon atoms and $n$ and $n'$ are 1 or 2 and $n''$ is 0, 1 or 2 which are useful as herbicides and their preparation.

OBJECTS OF THE INVENTION

It is an object of the invention to provide novel 6-chloro-1,3,5-triazines of Formula I.

It is another object of the invention to provide a novel process and novel intermediates for the preparation of the triazines of Formula I.

It is an additional object of the invention to provide novel pre-emergence herbicidal compositions.

It is a further object of the invention to provide a novel method of killing weeds.

These and other objects and advantages of the invention will become obvious from the following detailed description.

The novel triazines of the invention have the formula

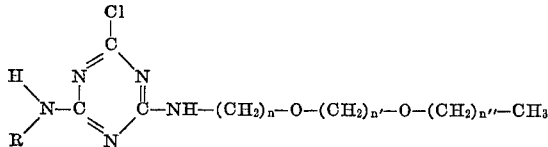

wherein R is a lower alkyl of 1 to 7 carbon atoms and $n$ and $n'$ are 1 or 2 and $n''$ is 0, 1 or 2.

The triazines of Formula I have interesting industrial uses, particularly in the agricultural field because they possess an important herbicidal activity, particularly an important pre-emergence herbicidal activity. The compounds can be used for the selective killing of weeds in a cultivated crop or as a total herbicide depending upon the dosage used. They can be used to destroy all plants in non-planted soils such as in industrial areas, railroad beds, roads, areas to insure protection from fires, etc.

The said compounds may be used alone or in combination with other known herbicides. They may be applied in the form of suspensions, dusts, wettable powders, emulsions, etc.

In order to prepare an organic solvent preparation suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones or chlorinated hydrocarbons, such as tetrachlorethane, trichloroethylene or tri- or tetrachlorobenzenes.

Aqueous preparation suitable for application can be prepared by the addition of water to emulsion concentrates, pastes or wettable powders. As emulsifying or dispersing agents there may be used non-ionic products, for example, condensation products or ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecylmercaptan with 12 molecular proportions of ethylene oxide. Among anion active emulsifying agents there may be mentioned the sodium salt of dodecyl alcohol sulfuric acid ester, the sodium salt of dodecylbenzene sulfonic acid, the potassium or triethanolamine salt of oleic acid or abietic acid or of a mixture of these acids, or the sodium salt of petroleum-sulfonic acid. As cation-active dispersing agents there may be used quaternary ammonium compounds, such as cetyl-pyridinium bromide or di - (hydroxyethyl)-benzyl-dodecyl ammonium chloride.

For making dusting or scattering preparations there may be used as solid carriers talcum, kaolin bentonite, calcium carbonate or calcium phosphate or carbon, cork meal or wood meal or other materials of vegetable origin. The various preparations can be rendered more suitable for the various ways in which they are to be used by the known addition of substances which improve the dispersing, adhesiveness, resistance to rain or penetration capacity of the compositions. As such substances there may be mentioned fatty acids, resins, glue casein or, for example, alginates or the like.

The novel process of the invention for the compounds of Formula I comprises reacting cyanuric chloride with a primary amine of the formula $$H_2N—(CH_2)_n—O—(CH_2)_{n'}—O—(CH_2)_{n''}—CH_3 \quad (II)$$

wherein $n$, $n'$ and $n''$ have the above definition to form the mono-substituted compound of the formula

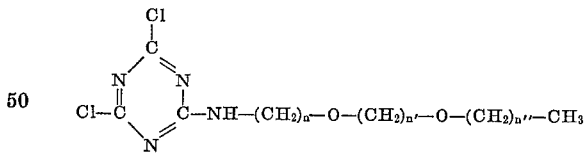

and reacting the latter with a primary amine of the formula $H_2N—R$ wherein R has the above definition to form the corresponding triazine of Formula I. If desired, the order of reaction can be reversed with cyanuric chloride being reacted first with the primary amine of the formula $H_2N—R$ and then with the primary alkoxylated amine.

The two amine condensations are effected in the presence of an acid acceptor such as an inorganic base or a tertiary organic base or the amine being condensed. Optimum yields obtained with one mole of amine and 1 equimolar amount of acid acceptor or 2 moles of amine per mole of cyanuric chloride. The absence of these ratios could cause incomplete reaction or formation of undesired triazines disubstituted with the same amine.

Examples of suitable acid acceptors are inorganic bases such as alkali metal carbonates, bicarbonates and hydroxides in an equimolar amount in the presence of water or a tertiary amine such as pyridine (one mole of tertiary amine per mole of cyanuric chloride). The condensations are preferably effected in an organic solvent such as chloroform, benzene, toluene, carbon tetrachloride, etc. or in the presence of water with a chlorocompound freshly precipitated by dissolution in an organic solvent followed by the addition of water thereto.

The amines of Formula II can be easily formed by the Gabriel method. An alcohol of the formula

is reacted with a chlorinating agent to form the corresponding chloride which is then condensed with potassium phthalimide to form a compound of the formula

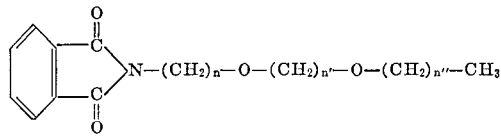

(III)

which is hydrolyzed under alkaline conditions to form the corresponding primary amine of Formula II. The compounds of Formula III are novel products.

The herbicidal compositions of the invention are comprised of a herbicidally effective amount of at least one compound of Formula I and a major amount of a herbicidal carrier. Particularly preferred is 2-(2''-ethoxy-2'-ethoxy)-ethylamino - 4 - ethylamino - 6 - chloro-1,3,5-triazine.

The novel herbicidal method of the invention comprises contacting undesired plants with a herbicidally effective amount of at least one compound of Formula I. The said compounds can be applied to the plants after emergence or to the fields before emergence. The usual useful dosage is 1.25 to 10 kg./ha.

In the following examples there are described several preferred embodiments to illustrate the invention. However, it should be understood that the invention is not intended to be limited to the specific embodiments.

EXAMPLE I

Preparation of 2-(2''-ethoxy-2'-ethoxy)ethylamino-4-ethylamino-6-chloro-1,3,5-triazine Step A—N - [2 - (2-ethoxyethoxy)ethyl]-phthalimide: 121 gm. (0.795 mole) of 1-chloro-2-(2'-ethoxyethoxy) ethane, produced by the process of Blicke et al., J.A.C.S., vol. 63 (1941), p. 2779, and 150 gm. (0.81 mole) of potassium phthalimide were introduced into 1200 cc. of dimethylformamide and the reaction mixture was refluxed for 2 hours. After cooling to room temperature, the reaction mixture was poured into an ice-water mixture, vacuum filtered, and the precipitate dried to obtain 123 gm. of N-[2-(2'-ethoxyethoxy) ethyl]-phthalimide having a melting point of 51° C.

Extraction of the mother liquors with chloroform gave an additional 70 gm. of the said phthalimide of equal quality.

I.R. Spectrum (chloroform)
C=O region
Absorption at $v_{max.}$=1,773 cm.$^{-1}$(weak)
Absorption at $v_{max.}$ shoulder=1,718 cm.$^{-1}$ ⎱ (strong)
Absorption at $v_{max.}$=1,709 cm.$^{-1}$ ⎰
C—O—C Region
Strong absorption for $\lambda$=9$\mu$ about As far as is known, this compound is not described in the literature.

Step B—1-amino - 2 - (2'-ethoxyethoxy)ether: 193 gm. of N-[2-(2'-ethoxyethoxy)ethyl]-phthalimide and 38.5 gm. of hydrazine hydrate were added to 850 cc. of ethanol containing 5% water and the reaction mixture was refluxed for one hour. After cooling the reaction mixture to room temperature and acidifying it by the addition of concentrated hydrochloric acid, the resulting precipitate was removed by filtration and the filtrate was evaporated to dryness. The residue was mixed with 200 cc. of water and the remaining insoluble matter was removed by filtration. The filtrate was evaporated to dryness and the residue was added to an aqueous sodium hydroxide solution to free the amine. The solution was extrated with a methanol-chloroform mixture and the organic extracts were combined, dried and evaporated to dryness. The resulting crude product was rectified under reduced pressure to obtain 40 gm. of 1-amino-2-(2'-ethoxyethoxy) ethane as a viscous liquid having a boiling point of 65° C. at 7 mm./Hg and of 180° C. at normal pressure and a refractive index $n_D^{20}$=1.4282. The product which was used as is for the next step was identical to the product as described in U.S. Pat. No. 2,285,419.

Step C—2,6-dichloro-4-ethylamino-1,3,5-triazine: First, 37 gm. (0.2 mole) of cyanuric acid chloride and then, 400 cc. of a chloroform solution of monoethylamine at 1 mole/liter (0.4 of monoethylamine) were added to 400 cc. of chloroform under a nitrogen atmosphere and at a maximum temperature of —5° C. The temperature of the reaction mixture was allowed to rise to room temperature and the mixture was evaporated to dryness under reduced presure. The residue was mixed with 200 cc. of benzene and heated to reflux. The ethylamine hydrochloride formed was eliminated by hot filtration and the filtrate was concentrated to a small volume to which was added petroleum ether having a boiling point of 65–75° C. The mixture was cooled and filtered to obtain 33.8 gm. of 2,6-dichloro-4-ethylamino-1,3,5-triazine having a melting point of 110° C. The product was identical to the product prepared by Diels, Ber., vol. 32 (1899), p. 691.

Step D—2 - (2''-ethoxy-2'-ethoxy)ethylamino-4-ethylamino-6-chloro-1,3,5-triazine: A mixture of 10.87 gm. (0.078 mol) of 1-amino - 2 - (2'-ethoxyethoxy)ethane, 100 cc. of chloroform and 7.9 gm. (0.078 mole) of triethylamine was added at a maximum temperature of 0° C. to a solution of 15 gm. (0.078 mole) of 2,6-dichloro-4-ethylamino-1,3,5-triazine in 225 cc. of chloroform. The mixture was then stirred at room temperature for 45 minutes and was washed with water to remove triethylamine chloride formed. The organic phase was dried and concentrated to dryness under reduced pressure. The residue was crystallized from acetone to obtain 19.2 gm. of 2-(2''-ethoxy - 2' - ethoxy)-ethylamino-4-ethylamino-6-chloro-1,3,5-triazine having a melting point of 125° C.

*Analysis.*—$C_{11}H_{20}ClN_5O_2$; molecular weight=289.77. Calculated (percent): C, 45.59; H, 6.95; Cl, 12.24; N, 24.17. Found (percent): C, 45.5; H, 6.7; Cl, 12.4; N, 24.2.

As far as is known, this product has not been described in the literature.

EXAMPLE II

Preparation of 2-(2''-ethoxy-2'-ethoxy)ethylamino-4-isopropylamino-6-chloro-1,3,5-triazine Step A—2,6 - dichloro 4-isopropylamino 1,3,5-triazine: First, 92.9 gm. cyanuric acid chloride and then a solution of 59.11 gm. of isopropylamine in 600 cc. of chloroform were added at —5° C. to 1000 cc. of chloroform and after stirring the reaction mixture for 1½ hours at room temperature, the solution was evaporated to dryness under reduced pressure. The residue was taken up in benzene and the solution was refluxed and filtered to remove the insoluble residue of isopropylamine hydrochloride. The filtrate was evaporated to dryness under reduced pressure to obtain 109 gm. of solvated 2,6-dichloro-4-isopropylamino-1,3,5-triazine. The I.R. spectrum in chloroform showed distinct absorptions at 3,402 cm.$^{-1}$ and at 1,500 and 1,600 cm.$^{-1}$.

Step B—2-(2″-ethoxy-2′-ethoxy)ethylamino-4-isopropylamino-6-chloro-1,3,5-triazine: 95 gm. of 2,6-dichloro-4-isopropylamino-1,3,5-triazine were added to 1500 cc. of chloroform cooled to 0° C. and a solution of 61.25 gm. of 1-amino 2 - (2′ - ethoxyethoxyl) ethane in 450 cc. of chloroform was added thereto. Then, a solution of 64.4 cc. of triethylamine in 450 cc. of chloroform was added thereto at 0° C. over 15 minutes. After standing for 19 hours at room temperature, the reaction mixture was washed with water, dried and evaporated to dryness under reduced pressure to obtain 140 gm. of a crude product. The said product was purified by chromatography over silica with elution with a 1:1 mixture of benzene and ethyl acetate to obtain 136.2 gm. of 2-(2″-ethoxy-2′-ethoxy) ethylamino-4-isopropylamino-6-chloro-1,3,5-triazine having a melting point of 50° C. (slow fusion).

*Analysis.*—$C_{12}H_{32}ClN_5O_2$; molecular weight=303.8. Caluculated (percent): C, 47.43; H, 7.30; N, 23.06; Cl, 11.67. Found (percent): C, 47.5; H, 7.3; N, 23.3; Cl, 11.5.

As far as it is known, this compound has not been described in the literature.

EXAMPLE III

Pre-emergence herbicidal properties

Beets, chysanthemum, flax, mustard, clover, foxtail, wheat and corn were planted in a flat measuring 23 x 14 x 4 cm. with a double bottom and watering from below. 20 seeds of each species were planted in rows 3 cm. apart in a single flat and there were 4 tests for each herbicide concentration. The growing conditions were: temperature of 20°±2° C., 60% humidity and lighting by fluorescent tubes (daylight+brilliant white) for 6 to 22 hours. The dirt used was a mixture of 10 volumes of normal dirt, 10 volumes of river sand and 2 volumes of peat. After 24 hours, the test products were sprayed onto the flats at dosages of 10, 5, 2.5 and 1.25 kg. of 2-(2″-ethoxy-2′-ethoxy) ethylamino-4-ethylamino-6-chloro-1,3,5-triazine per hectare. The first watering was effected by sprinkling so that the products reached the seeds. Controls without treatment were also used. 15 days after treatment the plants were cut off at the soil level and the above-ground portions were weighed. The results in the following table are expressed as percent of reduction of vegetation.

$$\frac{\text{weight of controls} - \text{weight of treated plants}}{\text{weight of controls}} \times 100$$

TABLE I

| Plants | Dosages in kg. of active material per ha. | | | |
|---|---|---|---|---|
| | 10 | 5 | 2.5 | 1.25 |
| Beet | | 100 | 58.9 ++ | 41.0 ++ |
| Chrysanthemum | | | | 100 |
| Flax | 74.6 | 32.8 | 0 | |
| Mustard | | 100 | 90.9 ++ | 85.2 ++ |
| Clover | | | | 100 |
| Foxtail | 87.5 + | 96.2 | 87.5 | 81.2 |
| Wheat | 35.7 | 27.9 | 16.6 | 13.6 |
| Corn | | 0 | | |

+=Burns.    ++=Serious burns.

The results of the above table show that the tested compound of the invention is herbicidally effective at a dosage between 5 and 2.5 kg./ha. against dicotyledons while being substantially harmless to monocotyledons, wheat and corn at the same dosage.

Various modificaitons of the herbicidal compositions and method of the invention may be made without departing from the spirit or scope thereof.

We claim:
1. A triazine of the formula

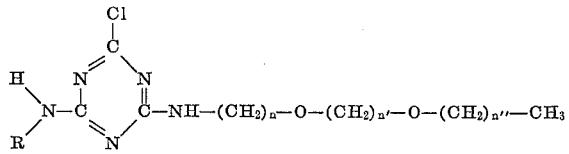

wherein R is a lower alkyl of 1 to 7 carbon atoms and $n$ and $n'$ are 1 or 2 and $n''$ is 0, 1 or 2.

2. 2-(2″-ethoxy-2′-ethoxy)ethylamino - 4 - ethylamino-6-chloro-1,3,5-triazine.

3. 2(2″-ethoxy - 2′-ethoxy)ethylamino - 4 - isopropylamino-6-chloro-1,3,5-triazine.

References Cited

UNITED STATES PATENTS

| 3,078,154 | 2/1963 | Gysin et al. | 260—249.8X |
| 3,459,751 | 8/1969 | Nikles | 260—249.8 |
| 3,479,353 | 11/1969 | Petzold et al. | 260—249.8X |

JOHN M. FORD, Primary Examiner

U.S. Cl. X.R.

71—93; 260—249.5, 326